(12) United States Patent
Ceccato et al.

(10) Patent No.: US 10,763,070 B2
(45) Date of Patent: Sep. 1, 2020

(54) LOW PRESSURE WIRE ION PLASMA DISCHARGE SOURCE, AND APPLICATION TO ELECTRON SOURCE WITH SECONDARY EMISSION

(71) Applicant: LASER SYSTEMS & SOLUTIONS OF EUROPE, Gennevilliers (FR)

(72) Inventors: Paul Ceccato, Paris (FR); Hervé Besaucèle, La Celle Saint Cloud (FR)

(73) Assignee: LASER SYSTEMS & SOLUTIONS OF EUROPE, Gennevilliers (FR)

( * ) Notice: Subject to any disclaimer, the term of this patent is extended or adjusted under 35 U.S.C. 154(b) by 0 days.

(21) Appl. No.: 16/070,785

(22) PCT Filed: Jan. 12, 2017

(86) PCT No.: PCT/EP2017/050596
§ 371 (c)(1),
(2) Date: Jul. 18, 2018

(87) PCT Pub. No.: WO2017/125315
PCT Pub. Date: Jul. 27, 2017

(65) Prior Publication Data
US 2019/0027336 A1  Jan. 24, 2019

(30) Foreign Application Priority Data

Jan. 19, 2016 (EP) .................................... 16151863

(51) Int. Cl.
*H01J 35/08* (2006.01)
*H01J 35/20* (2006.01)
(Continued)

(52) U.S. Cl.
CPC .............. *H01J 35/08* (2013.01); *H01J 35/04* (2013.01); *H01J 35/20* (2013.01); *H01J 47/026* (2013.01);
(Continued)

(58) Field of Classification Search
CPC .......... H01J 35/08; H01J 47/026; H01J 35/04; H01J 35/20; H01J 35/116; H05H 1/24; H01S 3/09716; H01S 3/09713
See application file for complete search history.

(56) References Cited

U.S. PATENT DOCUMENTS 3,721,915 A   3/1973 Reilly
4,888,776 A  12/1989 Dolezal et al.
(Continued)

FOREIGN PATENT DOCUMENTS

EP   2 079 092   7/2009
JP   4-255654    9/1992
(Continued)

OTHER PUBLICATIONS

Clark, William M. and Dunning, Gilmore J., "A Long Pulse, High-Current Electron Gun for e-Beam Sustained Excimer Lasers," IEEE Journal of Quantum Electronics, vol. QE-14, No. 2, Feb. 1, 1978, pp. 126-129.

(Continued)

*Primary Examiner* — Renan Luque
(74) *Attorney, Agent, or Firm* — Nixon & Vanderhye

(57) ABSTRACT

Disclosed is a low pressure wire ion plasma discharge source including an elongated ionization chamber housing at least two parallel anode wires extending longitudinally within the ionization chamber. A first of the at least two anode wires is connected to a DC voltage supply and a second of the at least two anode wires is connected to a pulsed voltage supply.

6 Claims, 4 Drawing Sheets

(51) Int. Cl.
  *H01S 3/0971* (2006.01)
  *H01J 35/04* (2006.01)
  *H01J 47/02* (2006.01)
  *H05H 1/24* (2006.01)

(52) U.S. Cl.
  CPC ...... *H01S 3/09713* (2013.01); *H01S 3/09716* (2013.01); *H05H 1/24* (2013.01); *H01J 35/116* (2019.05)

(56) References Cited

U.S. PATENT DOCUMENTS

| | | | |
|---|---|---|---|
| 4,955,045 A | 9/1990 | Friede et al. | |
| 5,097,475 A * | 3/1992 | Perzl | H01S 3/09713 372/86 |
| 5,134,641 A | 7/1992 | Friede et al. | |
| 8,664,863 B2 | 3/2014 | Makarov | |
| 2005/0067564 A1* | 3/2005 | Douglas | H01J 49/4215 250/290 |
| 2008/0308410 A1* | 12/2008 | Teschner | C23C 14/354 204/192.12 |
| 2009/0114815 A1* | 5/2009 | Vanderberg | H01J 37/026 250/288 |
| 2011/0057565 A1 | 3/2011 | Makarov | |
| 2012/0146509 A1* | 6/2012 | Hermanns | H01J 37/32045 315/111.21 |
| 2013/0040067 A1* | 2/2013 | Kennedy | B22F 3/115 427/474 |
| 2014/0076715 A1* | 3/2014 | Gorokhovsky | C23C 14/355 204/192.12 |
| 2018/0247797 A1* | 8/2018 | Gorokhovsky | C23C 16/27 |

FOREIGN PATENT DOCUMENTS

| | | |
|---|---|---|
| JP | H06-332327 | 12/1994 |
| JP | H08-36982 A | 2/1996 |
| JP | H09-233244 | 9/1997 |

OTHER PUBLICATIONS

Sentis, Marc L. et al., "Design and Characteristics of High Pulse Repetition Rate and High Average Power Excimer Laser Systems," IEEE Journal of Quantum Electronics, vol. 27, No. 10, Oct. 1, 1991, pp. 2332-2339.
International Search Report, PCT/EP2017/050596, dated Mar. 29, 2017.
Written Opinion, PCT/EP2017/050596, dated Mar. 29, 2017.
Japanese Office Action for Application No. 2018-554635 dated May 21, 2019 with English translation provided.
Korean Office Action, dated Jul. 22, 2019, from corresponding Korean patent application No. 10-2018-7020865.
Clark, Jr et al.; A Long Pulse, High-Current Electron Gun for e-Beam Sustained txcimer Lasers; IEEE Journal of Quantum Electronics; Feb. 1978; vol. QE-14, No. 2; pp. 126-129.

* cited by examiner

Fig.1
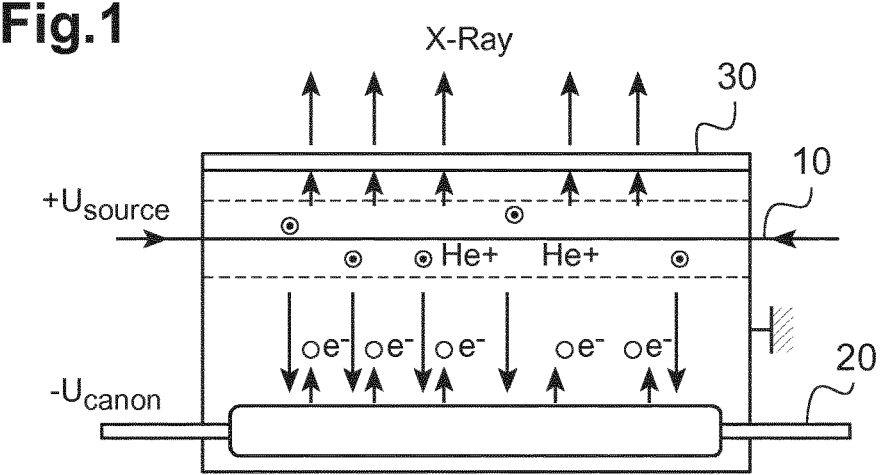
Fig.2
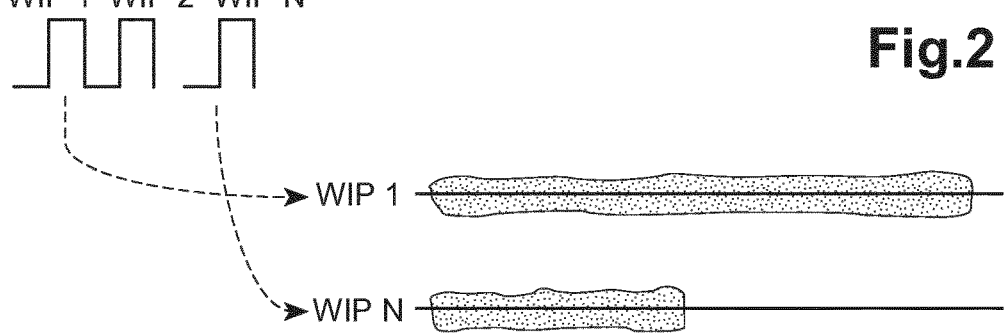
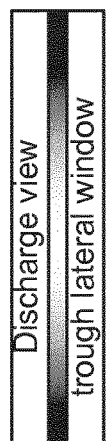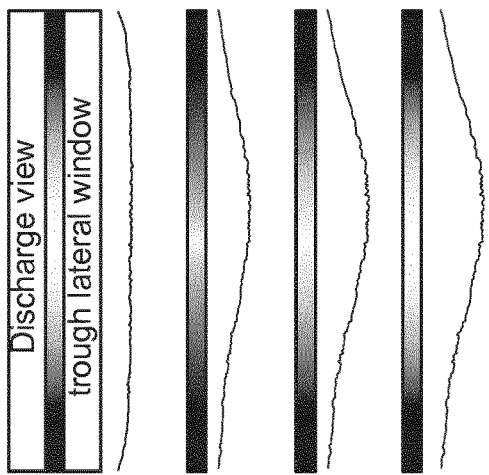
Fig.3

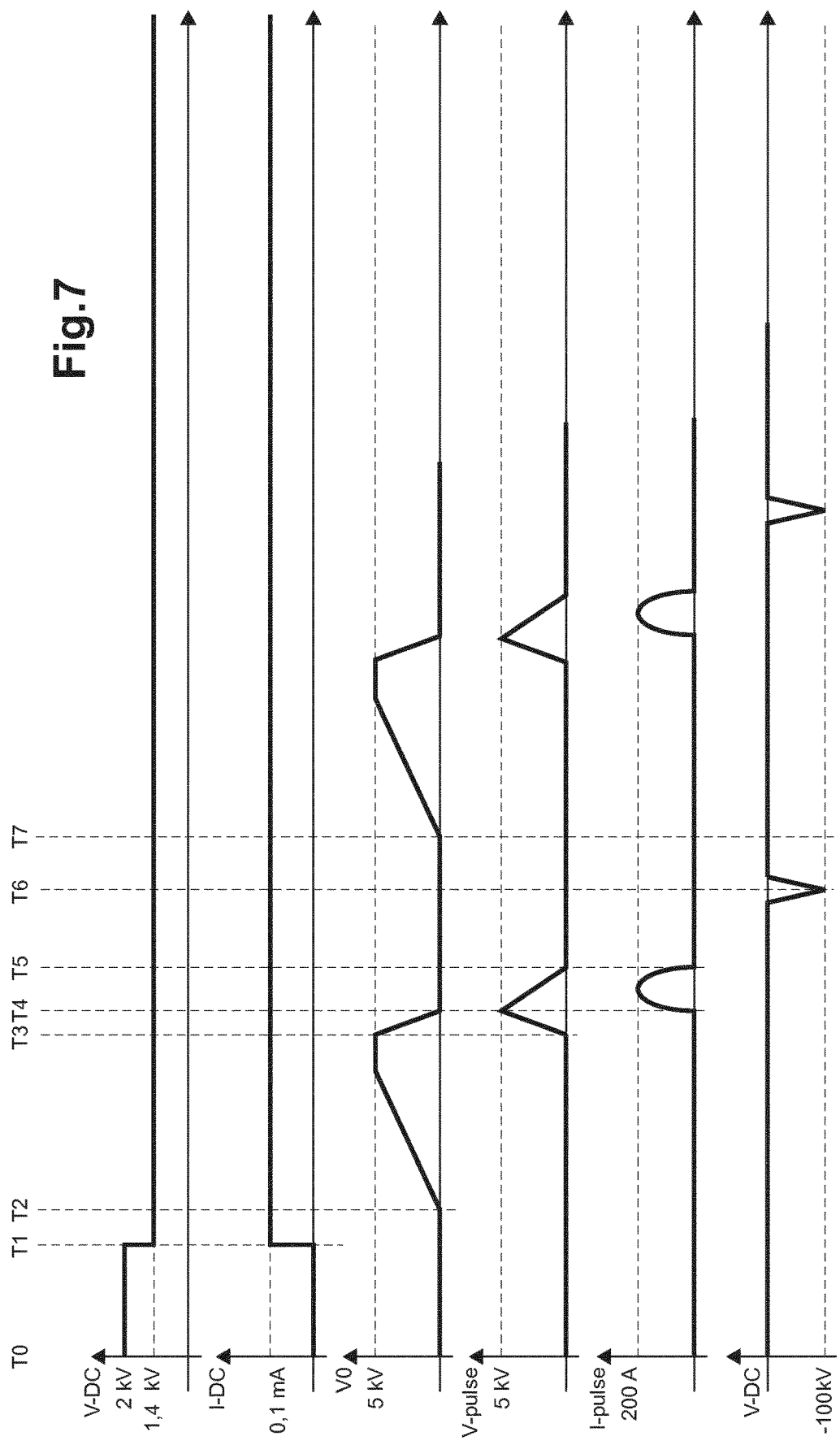

LOW PRESSURE WIRE ION PLASMA DISCHARGE SOURCE, AND APPLICATION TO ELECTRON SOURCE WITH SECONDARY EMISSION

BACKGROUND OF THE INVENTION

Field of the Invention

The present invention concerns a low pressure wire ion plasma discharge source, in particular for use as an ion source for secondary emission electron beam, especially for a pulsed X-ray source. This type of pulsed X-ray generator is typically used as a pre-ionization source for high energy excimer lasers.

Description of the Related Art

Principle of such an X-ray source is described for example by Friede et al. in U.S. Pat. No. 4,955,045. Typically, with reference to FIG. 1 which schematically represents a wire ion plasma (WIP) discharge source used in a secondary electron emission X-ray generator, a positive pulsed voltage (1-5 kV) is applied from a pulsed high voltage+U source to one or several parallel wires 10 (forming the anode of the device) extending longitudinally in an ionization chamber with a low gas pressure, typically helium. Application of the pulsed positive voltage creates a plasma of positive ions (for example $He^+$) formed along the wire(s). Following the creation of the ion ($He^-$) plasma, a negative high voltage pulse (typically about 100 kV) is applied to a cathode 20 positioned in the same enclosure. Positive ions are attracted towards the cathode 20 and, upon collision with the cathode 20, create secondary electrons forming an electron beam that propagates away from the cathode 20. A metal target 30 can be positioned in the electron beam path thus creating X-ray emission by slowing down the electron beam.

To obtain a reliable ion source for X-ray generator, in particular to be used in high energy excimer lasers, the WIP discharge has to meet several requirements:

- A high density of positive ions must be created to subsequently create a high density of secondary electrons resulting in a high enough X-ray dose. This typically necessitates high discharge current of at least 1 A/cm or more, typically 2 A/cm, for the WIP discharge.
- A reliable triggering (low pulse-to-pulse jitter) and good pulse-to-pulse stability for reliable and stable X-ray emission.
- A good spatial uniformity of the created plasma especially in the direction of the wire which can be longer than 1 meter in the case of an X-ray source for a high energy excimer laser.

Experience shows that it is rather difficult to fulfill these requirements altogether.

Creating an ion plasma in a low pressure gas such as helium by applying a high voltage pulse leads to a large statistical uncertainty linked to the presence of the free electrons necessary to initiate the gas breakdown. This causes a large jitter between the time the pulsed voltage is applied to the wire(s) and the inception of the plasma. Such jitter can depend on external conditions such as applied voltage, changing conditions of the surface of the ionization chamber walls and time between the applied voltage pulse and the previous discharge (see "Helium memory effect", Kurdle and al., J. Phys. D: Appl. Phys. 32(1999), 2049-2055).

Makarov in EP-2.079.092 is proposing a solution to this problem where instead of a single pulsed WIP discharge, several successive discharges (at high repetition rate, typically 100 Hz) are applied to the wire(s) before applying the negative pulse to the cathode. Due to the "memory" effect of low pressure gas (typically helium) discharge, the jitter is reduced for each successive discharge, improving the stability (in time and intensity) of the plasma created by the last positive pulse. However, this solution has several drawbacks:

- It forces to generate several WIP discharges for each electron beam pulse which reduces the reliability and lifetime of the device.
- It has been observed that the successive discharges in a long WIP source ($\geq 1$ m long) tend to cause unwanted longitudinal confinement of the plasma, thus degrading the uniformity of the ion source (see FIG. 2).

In this case, stability and low jitter come at the expense of uniformity.

On the other hand, it is also known from Gueroult et al., "Particle in cell modelling of the observed modes of a DC wire discharge", Journal of Physics D: Appl. Phys., Vol. 43, N° 36, that WIP discharge can be sustained continuously at low (DC) current (typically <1 m A/cm). Gueroult et al. also shows (see FIG. 3 which represents discharge profiles viewed through the lateral window) that under specific conditions of current and pressure, a DC WIP discharge can be sustained in a so-called "constricted mode for low pressure" (FIG. 3 (a) constricted mode—$p=1.10^{-2}$ mbar, I=1 mA) where the plasma is confined radially around the wire and elongated uniformly along the wire or a "diffuse mode" for higher pressure ($3(b)$, $3(c)$, $3(d)$ diffuse mode $p=2, 8.10^{-2}$ mbar longitudinal expansion with current for I=1, 1.5 and 2 mA) where the plasma expends radially but exhibits non-uniformity in the longitudinal direction (i.e. along the wire). In any case, for both modes of operation, the DC WIP discharge cannot produce a sufficient ion density to be directly used for an X-ray generator.

Japanese patent application JP-4-255654A discloses a pulsed electron gun comprising a low pressure gas ionization chamber housing an anode wire for generating positive ions by pulsed ionization of the gas. A DC voltage is applied in advance to the anode wire and a pulsed voltage is further applied to the anode wire. Thus, the plasma density inside the ionization chamber is increased and the number of positive ions extracted from the plasma and reaching the surface of the cathode is also increased. However, applying both the DC voltage and the pulsed voltage to the same anode wire presents the following drawbacks:

- The application of the high voltage/high current pulse on the wire can destabilize the continuous plasma;
- In JP-4-255654A, the continuous high voltage applied to the wire is a significant fraction of the pulse high voltage and no provision is made to avoid the continuous plasma to become unstable;
- The DC plasma discharge presents a negative resistance, and thus must be resistively ballasted in order to be stable. Consequently, superimposing the pulsed supply and the DC supply is not satisfactory because any stray capacitance (stray capacitance of cables and diodes) will induce oscillations of the DC discharge.

BRIEF SUMMARY OF THE INVENTION

Therefore, the aim of the present invention is to provide a low pressure wire ion plasma (WIP) discharge source, in particular for use as an ion source for secondary emission electron beam, especially for a pulsed X-ray source, overcoming the prior art drawbacks.

In particular, the aim of the present invention is to provide a low pressure wire ion plasma discharge source ensuring easy plasma establishment with a low jitter, a good stability and uniformity (constricted phase).

The above goals are achieved according to the invention by providing a low pressure wire ion plasma (WIP) discharge source that comprises an elongated ionization chamber and at least two anode wires, preferably parallel, extending longitudinally within the ionization chamber, wherein a first of said at least two anode wires is connected to a direct current (DC) voltage supply and a second of said at least two anode wires is connected to a pulsed voltage supply.

In operation, the first anode wire supplied with a DC voltage serves as an auxiliary source that provides excited or ionized species. These species serve as seeds for establishment of a pulsed high current plasma when the second anode wire is supplied with a high pulsed voltage, thus ensuring low jitter, stability and uniformity of the final main plasma.

Preferably, the direct current applied to the first anode wire is a low current (typically ≤1 mA/cm) to obtain and maintain the final main plasma in a uniform mode (constricted phase).

The low pressure WIP discharge source of the invention can comprise more than two anode wires. Either the DC voltage supply or the pulsed voltage supply can be connected to two or more parallel anode wires.

A typical configuration comprises a single anode wire connected to the DC voltage supply and two parallel anode wires connected to the pulsed voltage supply. The anode wire(s) can be connected to the pulsed voltage supply by one or both ends, or in case of multiple anode wires by alternating opposite ends of the anode wires.

In a preferred embodiment, the ionization chamber comprises a main elongated chamber and an auxiliary elongated chamber which are in fluidic communication along their lengths, preferably their entire lengths through a slit. At least one longitudinally extending anode wire, connected to the DC voltage supply, is housed within the auxiliary chamber and at least one longitudinally extending anode wire, connected to a pulsed voltage supply, is housed within the main chamber of the ionization chamber. With such an arrangement cross-talk or short circuit during application of the main high current pulse is avoided.

BRIEF DESCRIPTION OF THE DRAWINGS

The present invention will now be described in detail with reference to the drawings which represent:

FIG. 1, a schematic representation of the functioning of a classical secondary electron emission X-ray generator using a wire ion plasma discharge;

FIG. 2, a schematic representation of the ion plasma confinement using a single pulse WIP discharge or a multiple pulses WIP discharge;

FIG. 3, the configuration of DC wire plasma discharges depending on DC current value and gas pressure;

FIG. 7, a representation of a sequence and waveforms for operation of the ionization chamber according to the invention.

DETAILED DESCRIPTION OF THE PREFERRED EMBODIMENTS

Figure 4:
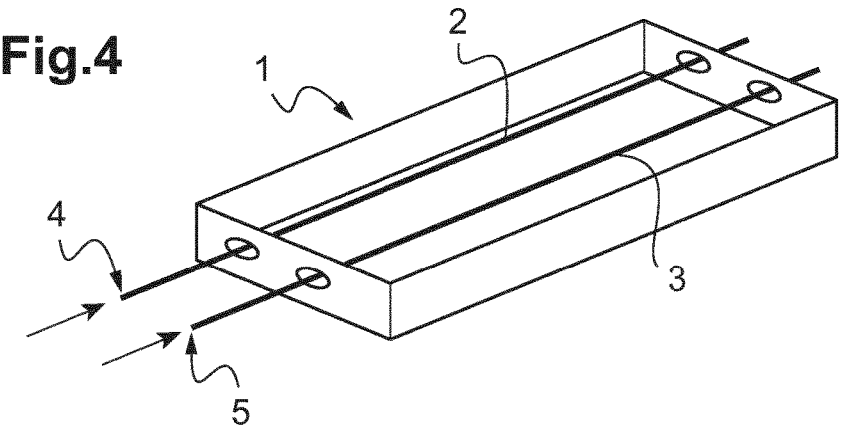
FIG. 4, a schematic representation of an ionization chamber according to the invention.

In FIG. 4, there is schematically represented an ionization chamber 1 according to the invention. The ionization chamber 1 is of elongated shape (typically of ≤1 m or more length) and houses two parallel anode wires 2, 3 extending longitudinally within the ionization chamber 1.

A first anode wire is connected to a DC voltage supply 4 intended to apply to the wire a high DC voltage (typically 0.5 to 1 kV) and a low DC current (typically 1 mA/cm).

The second anode wire is connected to a pulsed voltage supply 5 intended to apply a single high voltage (typically 1-5 kV) and high current (typically ≥1 A/cm; <10 µs) pulse.

By continuously applying a high voltage to one anode wire, thus creating a continuous current through said wire, when subsequently applying a high DC voltage to the other wire, a stable WIP discharge with almost no jitter is safely obtained. Of course, number and positioning of the anode wires of each type (DC and pulsed) can be chosen to optimize ion density and uniformity. Also, when several anode wires supplied with a pulsed high voltage are used, pulsed high voltage can be supplied to a same single end of the wires, both ends of the wires or an opposite end of each wire.

Figure 6:
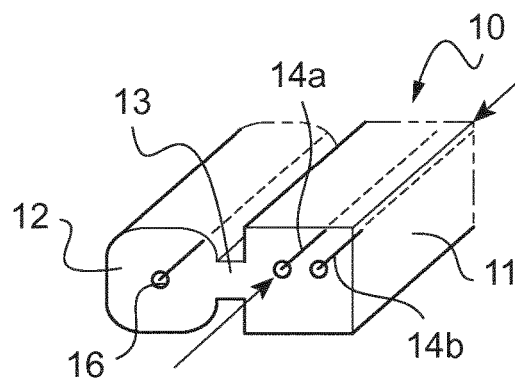
FIG. 6, a schematic representation of an embodiment of the ionization chamber according to the invention, comprising main and auxiliary ionization chambers.

In a specific embodiment, as shown in FIG. 6, the ionization chamber 10 comprises a main elongated chamber 11 and an elongated auxiliary chamber 12, auxiliary chamber 12 being in fluidic communication with main chamber 11 through an elongated slit 13 extending longitudinally along the length, preferably the entire length of the main and auxiliary chambers.

Main chamber 11 houses two parallel anode wires 14a, 14b extending longitudinally within the chamber (of course, only one anode or more than two anode wires may also be used).

Auxiliary chamber 12 houses an anode wire 15 extending longitudinally therein (of course, more than one anode wire may be disposed within the auxiliary chamber 12.

Figure 5:
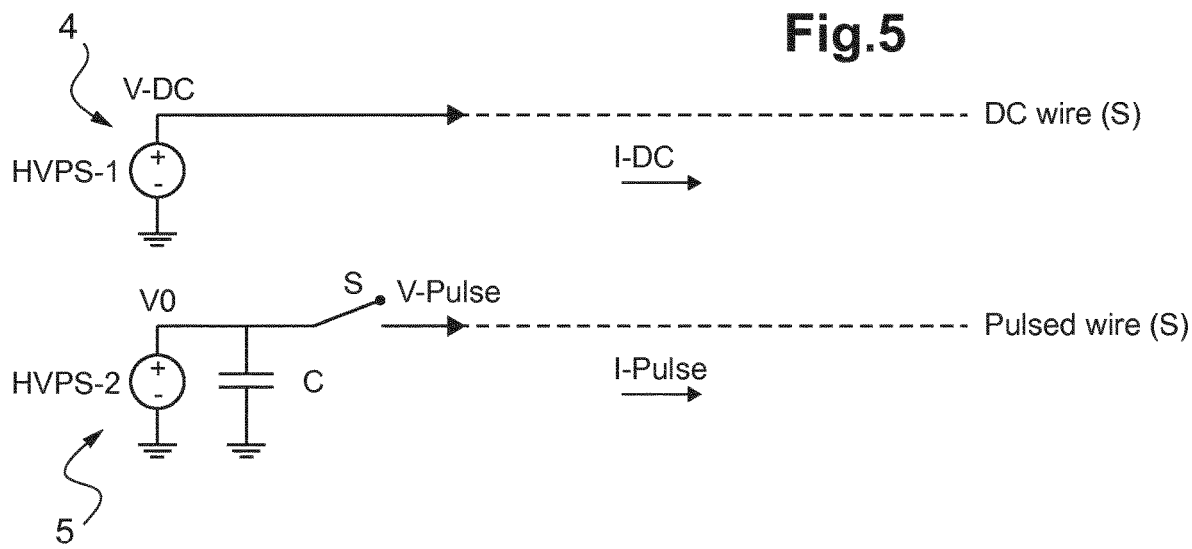
FIG. 5, a schematic representation of the DC voltage supply and the pulsed voltage supply.

The anode wire(s) 15 located within the auxiliary chamber 12 is connected to a high voltage/low current DC supply (as shown in FIG. 4). The anode wires 14a, 14b located within the main chamber 11 are connected to a pulsed high voltage/high current supply (for example, as shown in FIG. 5). In the embodiment of FIG. 6, anode wires 14a, 14b are connected to the pulsed high voltage/high current supply through opposite ends. Of course, they also could be connected through their same side ends or both ends.

The elongated main and auxiliary chambers may have any suitable shapes such as parallelepipedic or cylindrical shapes. The overall longitudinal length of the main and auxiliary chambers is typically 1 m or more.

In reference with FIG. 7, a typical operation sequence of the ionization chamber according to the invention will now be described when used for producing a secondary electron emission beam.

1. Ionization Camber Characteristics

Ionization chamber: The chamber has a parallelepipedic shape with the following typical dimensions: length 130 cm, width 4 cm and height 4 cm.

Figure 8A:
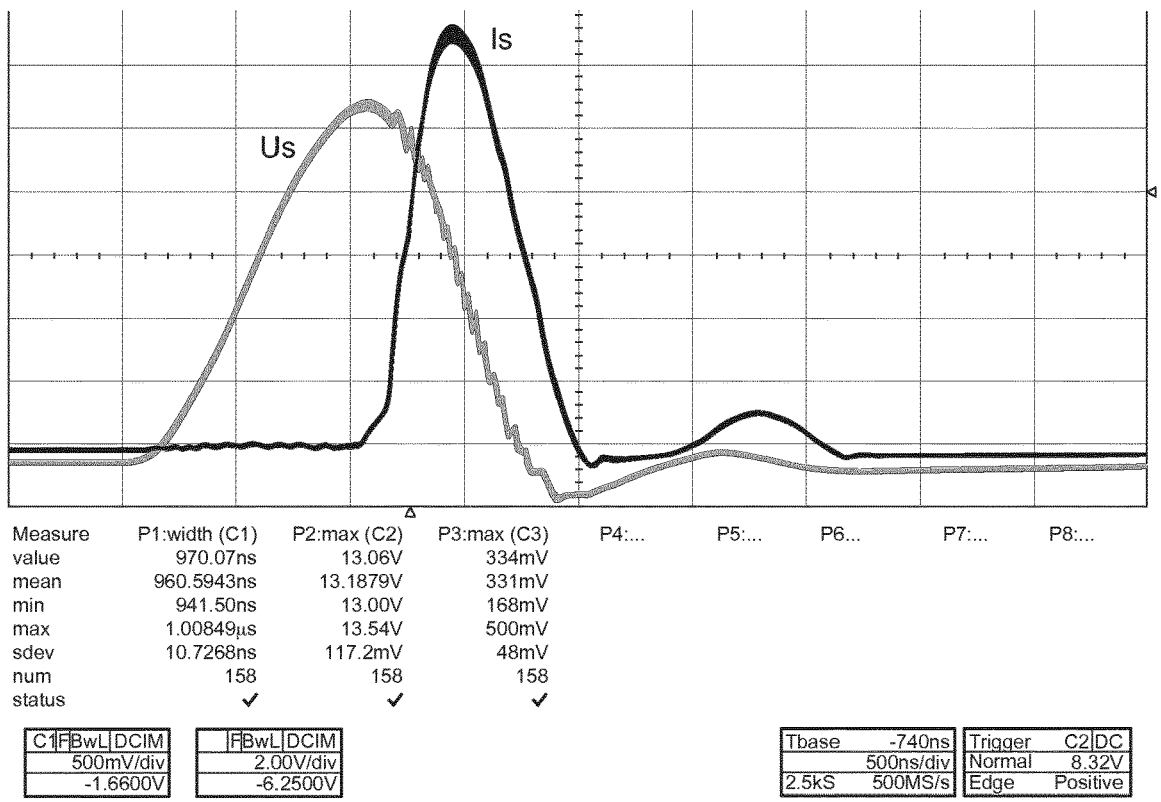
FIGS. 8A and 8B, voltage and current curves on the pulsed anode wire with application of a DC current according to the invention (7A) and without DC current (7B).
Figure 8B:
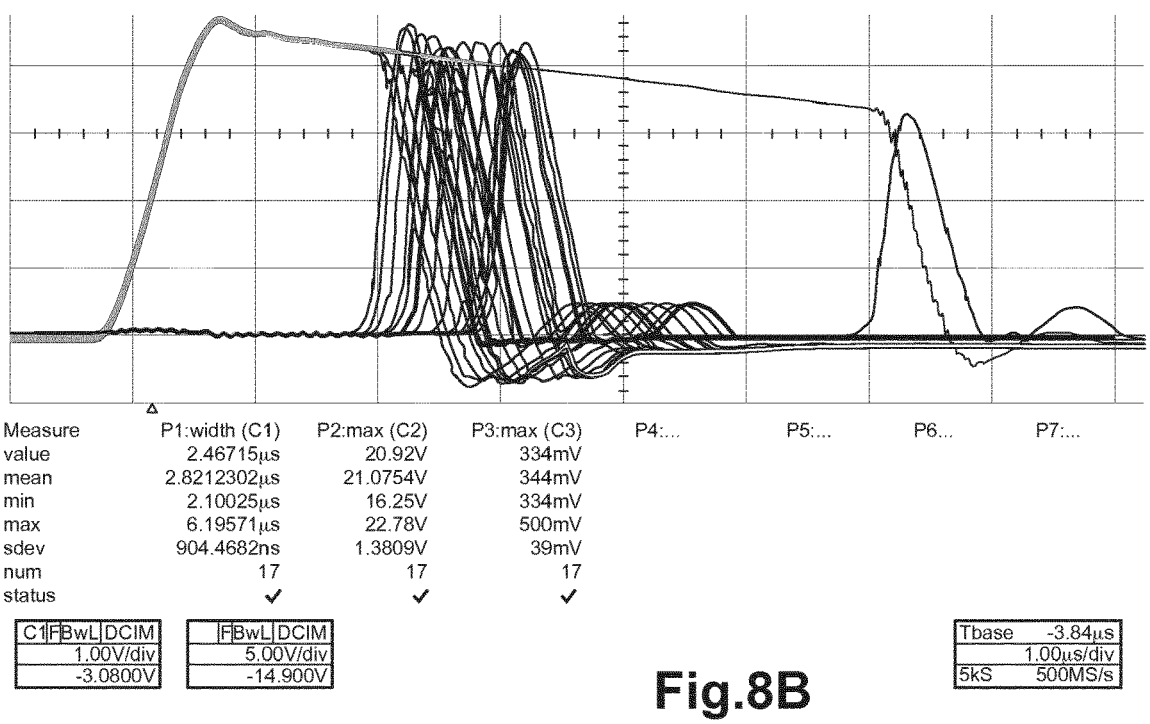

Anode Wires
  DC voltage anode wire: one DC wire, typically 200 μm in diameter
  Pulsed voltage anode wire: two Pulsed wires, typically 300 μm in diameter
DC supply (HVPS-1) with the following characteristics:
  Output high voltage typically 2 kV;
  Controllable Output current that can be limited to typically 0.3 mA for 1.30 m wire length (hence≤0.3 mA/m) thus keeping the DC plasma in constricted mode;
Pulsed power supply with the following characteristic (see FIG. 5):
  a high voltage power supply (HVPS-2) with HV output of typically 5 kV;
  a capacitor C, typically 30 nF to store electrical energy and subsequently deliver it to the pulsed wire;
  a switch S, capable of closing rapidly and handle voltage of up to 5 kV and current of up to typically 500 A in order to deliver a high voltage pulse to the pulsed wire (s). The switch can be formed of one or several IGBTs. Alternatively MosFET transistors can be used. Alternatively thyratron also can be used (it shall be noted that in the case of a thyratron, a transformer must be used)
2. Operation
Upon startup (T0), a high DC voltage (typically 2 kV) is applied to one wire.
After some time (T1), the plasma is created around the wire and current flows. The power supply current limit is set at a value low enough to maintain the DC plasma in constricted mode and high enough to generate enough charges for the stable formation of the pulsed WIP. Typical current setpoint may depends on wire diameter and chamber geometry (distance wire—wall, distance between wires). For a DC wire of 200 μm diameter, 1.5 m length, positioned at ~1 cm of the chamber walls, current setpoint is 0.1 mA. Once the said plasma is established, power supply voltage drops at a value depending on the plasma impedance, typically 1 kV. This DC plasma is sustained continuously during the operation of the device.
At T2, HVPS-1 is charging capacitor C to a set high voltage, typically 5 kV.
Once the capacitor C is charged, at T3, the switch S is closed and subsequently, the Pulsed wire is submitted to the same high voltage. The voltage rise time depends on the circuit physical characteristics, designed to be fast (typically <1 μs)
At T4, the high voltage appearing on the pulsed wire is forming the pulsed WIP plasma and a high current starts flowing in the ionization chamber, creating high ion density during a time that depends on the pulse power supply design (typically a few μs).
At T5, the electrical energy stored in capacitor C has been fully transferred to the plasma and the pulsed current stops
At T6, after a time delay precisely controlled, a negative high voltage pulse (typically −100 kV) is applied to the cathode, accelerating the ion plasma, creating secondary electrons and subsequent X-ray emission.
At T7, controlled depending on the desired repetition rate of the X-ray source, the cycle (starting at T2) is repeated
Typical Delays:
DC plasma inception (T1-T0): non critical (only at startup), typically <1 s
Charge time of the capacitor C (T3-T2): must be shorter than the desired time between successive X-ray pulses, typically <100 ms for 10 Hz operation.
Rise time of the voltage across the pulse wire (T4-T3): must be fast enough to efficiently form the pulse plasma. Depends on the circuit parameters (switch closing time, inductance), typically <1 μs.
Duration of the WIP plasma (T5-T4): typically 2 μs
Delay Pulsed WIP plasma—e-beam (T5-T6): typically 5 μs
Repetition rate (T7-T2): typically 1-100 Hz (0.01-1 s)
The sequence and waveforms for operation are shown in FIG. 7.
FIGS. 8A and 8B show the ion source voltage and current on pulsed anode wire when a DC current is applied to the other wire (100 shots) (FIG. 8A) and when no DC current is applied (FIG. 8B). Without DC current, there is a large jitter and a poor stability of the WIP discharge.

The invention claimed is:
1. A low pressure wire ion plasma discharge source comprising:
  an elongated ionization chamber housing at least two anode wires extending longitudinally within the ionization chamber;
  a DC voltage supply; and
  a pulsed voltage supply,
  wherein a first of said at least two anode wires is connected to the DC voltage supply and a second of said at least two anode wires is connected to the pulsed voltage supply simultaneously, such that a first continuous voltage is able to be continuously applied to the first anode wire while a second pulsed voltage is able to be applied to the second anode wire,
  wherein the DC voltage supply outputs the first continuous voltage and the pulsed voltage supply outputs the second pulsed voltage.
2. The low pressure wire ion plasma discharge source according to claim 1, further comprising a plurality of anode wires connected to the DC voltage supply and/or a plurality of anode wires connected to the pulsed voltage supply.
3. The low pressure wire ion plasma discharge source according to claim 1, wherein the direct current generated by the DC voltage supply is equal to or lower than 1 m A/cm.
4. The low pressure wire ion plasma discharge source according to claim 1, wherein the pulsed voltage supply generates a pulsed large current of 1 to 5 A/cm or more.
5. The low pressure wire ion plasma discharge source according to claim 1, wherein the ionization chamber comprises a main elongated chamber and an elongated auxiliary chamber in fluidic communication along their entire lengths through a slit, the at least one pulsed voltage supplied anode wire extending longitudinally in the main chamber and the at least one DC voltage supplied anode wire extending longitudinally in the auxiliary chamber.
6. An electron source with secondary emission under ion bombardment in a low pressure chamber, the electron source comprising:
  a low pressure wire ion plasma discharge source comprising:
    an elongated ionization chamber housing at least two anode wires extending longitudinally within the ionization chamber,
    a DC voltage supply, and
    a pulsed voltage supply,
  wherein a first of said at least two anode wires is connected to the DC voltage supply and a second of said at least two anode wires is connected to the pulsed voltage supply simultaneously, such that a first continuous voltage is able to be continuously applied to the first anode wire while a second pulsed voltage is able to be applied to the second anode wire,
wherein the DC voltage supply outputs the first continuous voltage and the pulsed voltage supply outputs the second pulsed voltage.

\* \* \* \* \*